US007731912B2

(12) United States Patent
Franklin et al.

(10) Patent No.: US 7,731,912 B2
(45) Date of Patent: Jun. 8, 2010

(54) EVAPORATOR/CALCINER

(75) Inventors: Kenneth James Franklin, Deep River (CA); Andrew Donald Kettner, Deep River (CA); Bruce Wayne Hildebrandt, Deep River (CA); Howard Charles Jessup, Jr., Pembroke (CA)

(73) Assignee: Atomic Energy of Canada Limited, Mississauga, Ontario (CA)

( * ) Notice: Subject to any disclaimer, the term of this patent is extended or adjusted under 35 U.S.C. 154(b) by 434 days.

(21) Appl. No.: 11/855,794

(22) Filed: Sep. 14, 2007

(65) Prior Publication Data

US 2008/0214886 A1 Sep. 4, 2008

Related U.S. Application Data

(60) Provisional application No. 60/825,683, filed on Sep. 14, 2006.

(51) Int. Cl.
*G21C 1/00* (2006.01)
*G21F 9/14* (2006.01)
*F23G 7/00* (2006.01)
*B01D 1/22* (2006.01)

(52) U.S. Cl. ....................... 422/159; 422/187; 422/198; 422/229; 422/193; 422/903; 588/1; 588/18; 588/19; 110/237; 159/DIG. 12

(58) Field of Classification Search ................. 422/159, 422/187, 198, 229, 193, 903; 110/237, 238, 110/242; 159/DIG. 12, 5; 588/1, 18, 19
See application file for complete search history.

(56) References Cited

U.S. PATENT DOCUMENTS 5,678,237 A * 10/1997 Powell et al. ................ 588/11

* cited by examiner

*Primary Examiner*—Walter D Griffin
*Assistant Examiner*—Lessanework Seifu
(74) *Attorney, Agent, or Firm*—Barnes & Thornburg LLP

(57) ABSTRACT

Disclosed herein is provided an evaporator/calciner in which hazardous materials, such as radioactive liquids, are converted into chemically stable, solid forms by evaporating, drying and calcination within a single vessel, that can then be sealed and used for long term storage.

24 Claims, 5 Drawing Sheets

EVAPORATOR/CALCINER

RELATED APPLICATION

This application claims priority to U.S. Ser. No. 60/825,683, the contents of which are hereby incorporated by reference in their entirety.

FIELD OF THE INVENTION

The invention relates to an apparatus and method for converting solutions of hazardous liquid materials, such as radioactive liquids, into chemically stable and solid forms.

BACKGROUND

Highly radioactive liquid wastes are produced during isotope production processes. Even relatively dilute liquid radioactive wastes remain hazardous. Because of the large volume of aqueous waste produced, the handling, transportation and storage of such liquid radioactive waste remains problematic.

It would be desirable to convert solutions of hazardous material, such as radioactive liquids, into chemically stable, solid forms by evaporating solvent, removing adventitious or included solvent and thermally decomposing solute components within a vessel that, upon closure, is suitable for subsequent handling and storage. Volume reduction and waste immobilization are central to strategies for safely managing such hazards.

Solvent evaporation can, for example, be achieved in open vats, boilers, thin film evaporators, wiped film evaporators and rotary evaporators. However, such systems do not take a solution directly to a stable solid or chemical form. In such systems, the evaporation chamber is typically used repeatedly and is not adapted for subsequent processing and disposal. In addition, the cost and complexity of such fixed installations make them generally suitable only for processing relatively large volumes of waste solutions. Rotary calciners for large scale operations have been developed for similar applications but are not readily adapted to simple systems operating on a small scale. Calcination systems based on fluidized beds do not provide for containment of hazardous materials and require a separation process for recovery of the final product. Furnaces can be used for calcining materials inside refractory metal or ceramic containers, but are not readily modified to accommodate continuous feed of liquid wastes or to meet containment requirements for hazardous materials.

McGinnis, et al., "Development and Operation of a Unique Conversion/Solidification Process for Highly Radioactive and Fissile Uranium", *Nucl. Technol.* 77, 210-219, (1987), describe a process in which waste solution is fed continuously into a heated vessel, but evaporation is from a bulk volume of liquid rather than a relatively small volume of solution distributed through a long channel.

U.S. Pat. No. 4,144,186 describes a process in which waste solution is denitrated, spray dried, and calcined prior to mixing with glass forming components to generate a solidified waste form.

There remains a need, therefore, for an apparatus and method for converting solutions of hazardous liquid materials, such as radioactive liquids, into chemically stable and solid forms; that is suitable for small scale operations; hot cell operations using remote-handling manipulators; rigorous containment of hazardous, fissile, or highly radioactive materials; and for combining evaporation, drying and thermal decomposition operations in a continuous process within a single vessel that is suitable for subsequent handling, storage, inspection and verification and disposal.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In accordance with one aspect of the present invention, there is provided a device for converting liquid material into solid form by evaporation, drying and calcining comprising a containment vessel adapted to be placed in heat exchange transfer relation with an external source of heat; said containment vessel comprising a fluid inlet; an elongated passageway; a collection chamber; a scrubber; and an exhaust outlet; said fluid inlet adapted for connection to a source of liquid material to be converted; said elongated passageway in fluid communication at one end with said inlet and at the other end with said collection chamber, and in heat transfer relation with said external source of heat whereby said liquid material flowing in said passageway is converted into a gaseous phase and a concentrated liquid phase; means for directing said gaseous phase from said passageway into said collection chamber and for directing said concentrated liquid phase from said passageway onto the walls of said collection chamber; said walls of said collection chamber being in heat transfer relation with an external source of heat, whereby said concentrated liquid phase is converted into a gaseous phase and calcined solid material in said collection chamber; said exhaust outlet being in fluid communication with said collection chamber for conducting said gaseous phase out of said containment vessel; said scrubber being disposed in said containment vessel between said collection chamber and said exhaust outlet for removal of aerosols and particulate matter entrained in said gaseous phase.

In accordance with another aspect of the invention, there is provided a method for converting liquid material into solid form by evaporation, drying and calcining within a single containment vessel comprising: providing a containment vessel having an elongated passageway in fluid communication with a collection chamber; supplying a stream of said liquid material to said elongated passageway; heating said elongated passageway to cause said liquid material to convert in said passageway to a gaseous phase and a concentrated liquid phase; separating said gaseous and concentrated liquid phases; applying said separated concentrated liquid phase to the walls of a collection chamber; heating the walls of said collection chamber to cause said concentrated liquid material to convert to a gaseous phase and a calcined solid phase; passing said gaseous phases through a scrubber to remove entrained aerosols and particulate materials; and venting said scrubbed gaseous phases out of said containment vessel.

In accordance with another aspect of the invention, the containment vessel is sealed with the calcined solid phase inside the containment vessel for disposal or storage.

In a preferred embodiment, the fluid inlet, elongated passageway, scrubber; and exhaust outlet are disposed on a cylindrical insert adapted for insertion into a cylindrical containment vessel and the elongated passageway is defined by a generally helical groove formed by an external thread disposed on the surface of the insert which engages the inner wall of the containment vessel.

Figure 1:
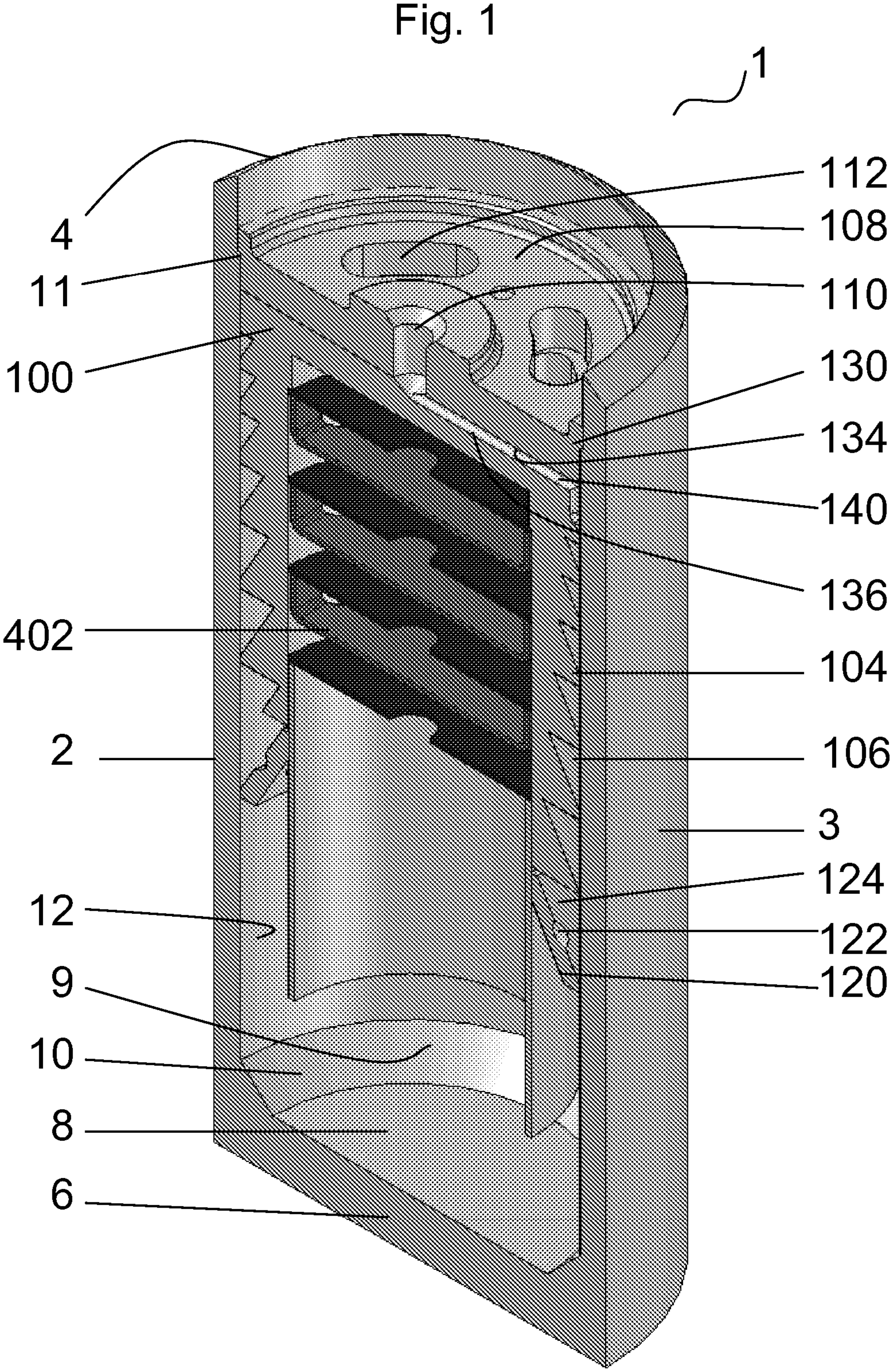
FIG. 1 is a cross-sectional perspective view of one embodiment of the evaporator/calciner of the present invention.

In the detailed description that follows the numbers in bold face type serve to identify the component parts that are described and referred to in relation to the drawings depicting various embodiments of the invention. It should be noted that in describing various embodiments of the present invention, the same reference numerals have been used to identify the same or similar elements. Moreover, for the sake of simplicity, parts have been omitted from some figures of the drawings.

DETAILED DESCRIPTION OF THE INVENTION

Figure 2:
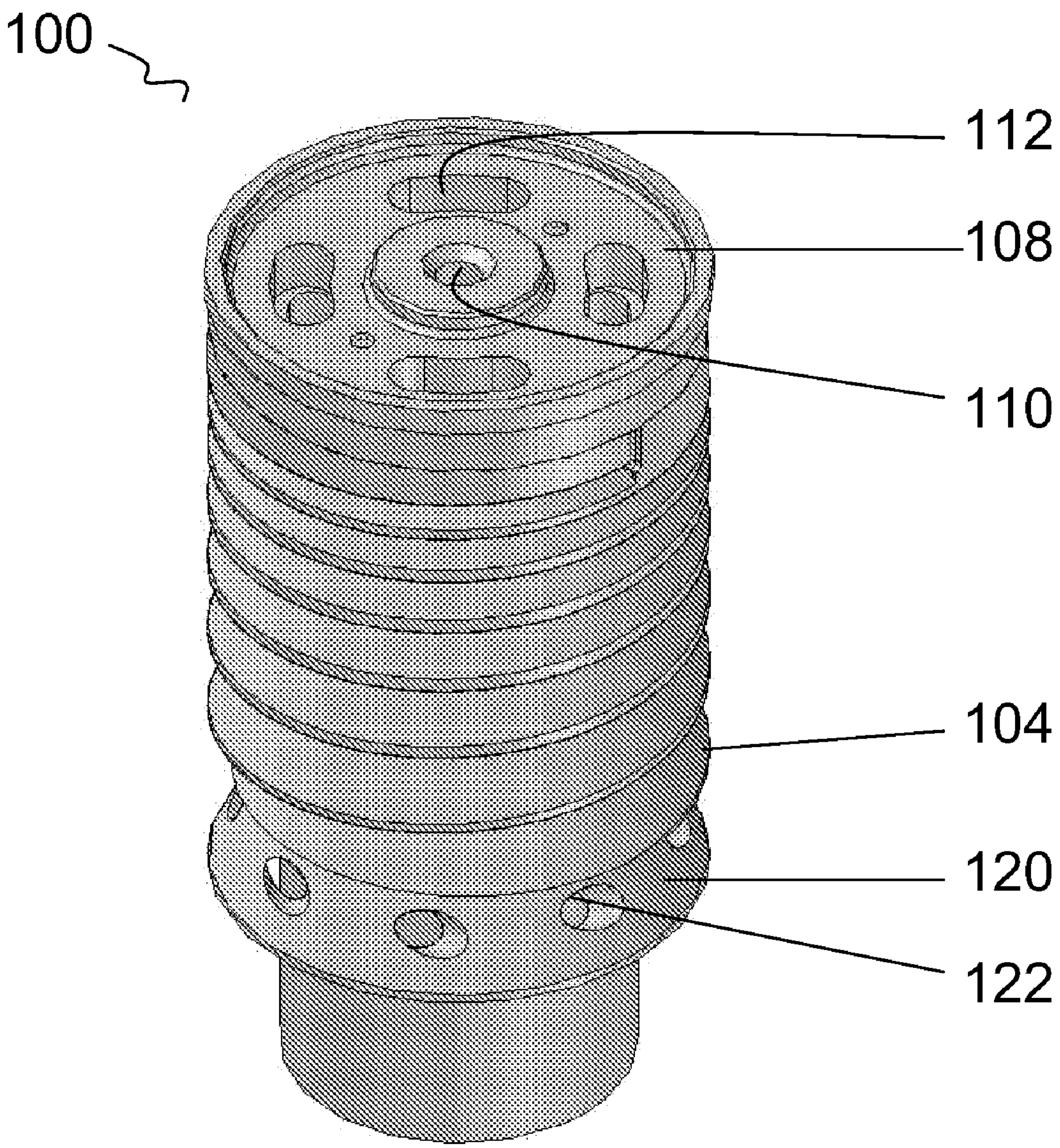
FIG. 2 is a perspective view of an insert according to one embodiment of the present invention.

Referring to FIGS. 1 and 2, the evaporator/calciner of the present invention, generally indicated by reference numeral 1, comprises containment vessel 2 and insert 100. Containment vessel 2 is cylindrical in shape having open end 4 and closed end 6. The interior of containment vessel 2, at closed end 6, defines collection region 8. Collection region 8 optionally includes sloped inner wall 10. Collection region 8 may be sized to accommodate a range of volumes of waste.

Insert 100 is generally cylindrical in shape and is sized to be closely received within containment vessel 2. Insert 100 has formed on its outer surface helical thread 104 which engages the interior wall 12 of containment vessel 2 defining helical channel 106 therebetween.

Insert 100 is retained in containment vessel 2 by securing plate 108 at the upper end of insert 100. Although securing plate 108 and insert 100 are shown in FIG. 1 as a separate elements, securing plate 108 and insert 100 may be integrally formed. Securing plate 108 includes shoulder 130 that abuts rim 11 to precisely locate insert 100 within containment vessel 2. Securing palate 108 is sealed to containment vessel 2 to prevent gas and/or fluid from escaping from vessel 2 when shoulder 130 and rim 11 abut. Sealing can be accomplished by a seal weld, shrink fit or other means known to the skilled worker.

Securing plate 108 includes feed inlet orifice(s) 110 and exhaust gas orifice(s) 112. Feed inlet orifice(s) 110 is connected through a suitable conduit (not shown) to a source of feed solution to be treated. For example, the conduit may be connected to pump, such as a positive displacement pump, that draws feed solution from a reservoir or other storage facility (not shown). Exhaust gas orifice(s) 112 is connected through a suitable conduit to a condenser, a condensate collection vessel, or additional off-gas treatment systems or devices (not shown) as required. It will be clear to the skilled worker that the number and positioning of orifice(s) 110 and exhaust gas orifices 112 can vary. For example, the orifices can, for example, be positioned co-axially, side-by-side, center-side and the like.

Underside 134 of securing plate 108 and upper side 136 of inset 100 define supply channel 140 therebetween that is in fluid communication with feed inlet(s) 110 and helical channel 106.

In accordance with an embodiment of the present invention, insert 100 further comprises annular flange 120 about its lower periphery that is sized to engage, or nearly engage, interior wall 12 of containment vessel 2 and define therebetween a small annular reservoir volume 124 that is in fluid communication with helical channel 106. Annular flange 120 includes vent(s) 122 that maintain annular reservoir volume 124 in fluid communication with the interior 9 of containment vessel 2.

Figure 4:
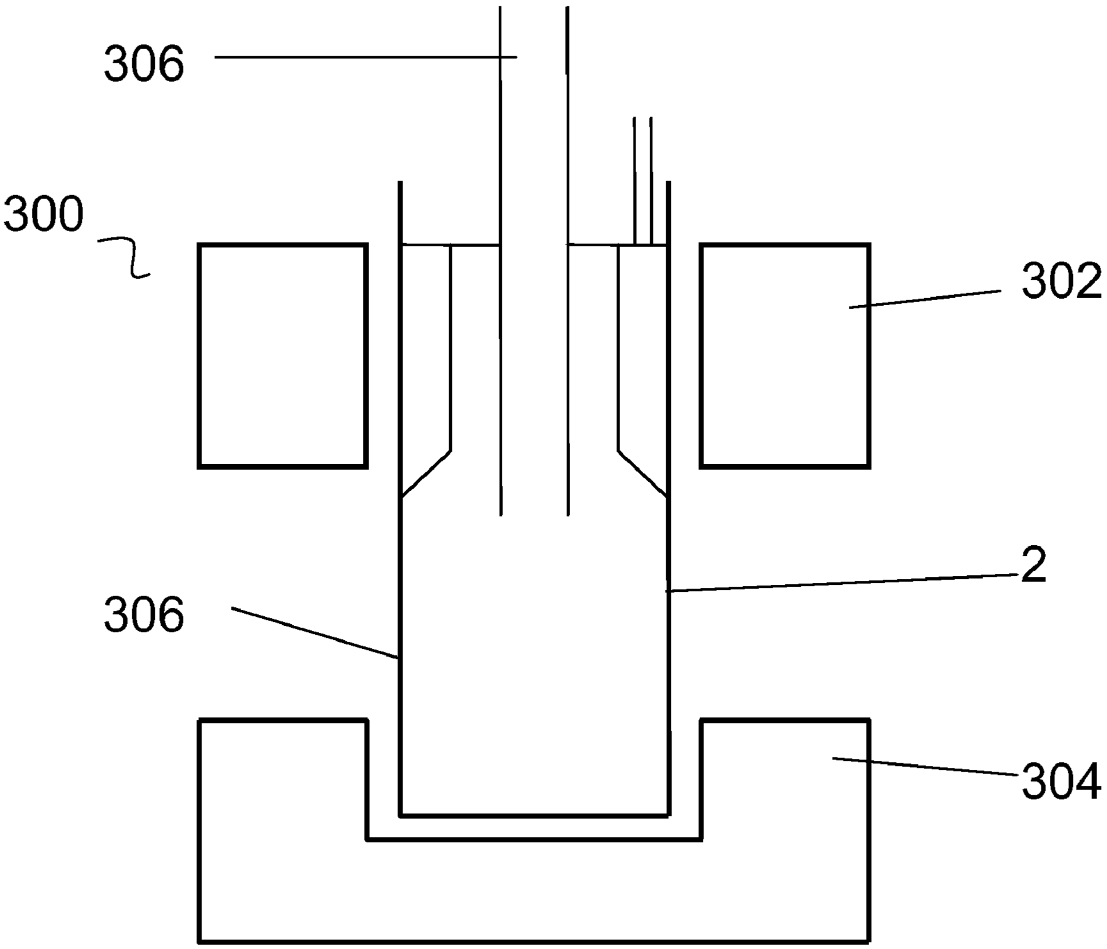
FIG. 4 is a schematic diagram showing an evaporator/calciner according to one embodiment of the present invention in a furnace.

As shown in FIG. 4, containment vessel 2 is sized to fit within furnace 300. Furnace 300 includes upper heating block 302 and lower heating block 304, which are in contact with collection vessel 2. Heat from upper heating block 302 is conducted through wall 2 to heat the solution in helical channel 106. Heat from lower heating block 304 is conducted through wall 2 to heat the solution in collection region 8. Process monitoring is obtained from contact thermometry on the wall of collection vessel 2, probes within the heating blocks, and probes in the off-gas stream, using thermocouples 306. The temperature settings for upper heating block 302 and lower heating block 304 in furnace 300 are such that there is a temperature gradient along the length of containment vessel 2 with the temperature at the bottom being higher than at the top. For example, in one representative application, upper heating block 302 is approximately 300° C. and lower heating block 304 is greater than 500° C.

In use, the feed solution is supplied from a feed stream though a suitable conduit to feed inlet(s) 110. A pump, such as a positive displacement pump, can be used to supply the feed solution to feed inlet(s) 110 from a reservoir or storage vessel. The feed solution enters feed inlet(s) 110 and flows through supply channel 140 to helical channel 106. As the feed solution flows along helical channel 106, heat is transferred from furnace 300 to outer wall 3 of vessel 2, which in turn heats the feed solution flowing through helical channel 106. As the concentrated feed solution and steam flow toward annular reservoir volume 124, the temperature in helical channel 106 continues to increase due to the increased boiling point of the more concentrated solution produced as a result of evaporation. As the boiling point rises, the temperature in helical channel 106 also rises due to heat transfer from upper heating block 302 of furnace 300 through vessel wall 3. The resulting concentrated solution and steam pass out of helical channel 106 into annular reservoir volume 124.

Steam in annular reservoir volume 124 escapes into interior 9 through vent(s) 122 in annular flange 120. Concentrated solution in annular reservoir volume 124 flows down wall 12 of containment vessel 2, into collection region 8. As the concentrated solution flows over wall 12 and onto the bottom of collection region 8, its temperature continues to increase due to heat transfer from lower heating block 304 of furnace 300 through vessel wall 3 resulting further evaporation and thermolytic reactions such as dehydration, denitration and calcination.

The steam escaping into interior 9 of vessel 2 through vent(s) 122 in annular flange 120 from annular reservoir volume 124, and steam generated from evaporation in collection region 8 flows up the interior of insert 100, through dust scrubber screen(s) 402 and out exhaust gas orifice(s) 112. Exhaust gas orifice(s) 112 leads through a suitable conduit to a condenser, a condensate collection vessel, additional off-gas treatment systems or devices as required.

It has been found that the use of a helical channel is a very efficient means for heating a relatively small volume of feed solution. In this arrangement, the feed solution flowing through helical channel 106 does not boil violently, minimizing the production of aerosols which could escape with the steam into the exhaust gas stream. Additionally, the steam produced in helical channel 106 promotes the flow of concentrated solution toward annular reservoir volume 124.

Although the helical channel can have a number of different cross-sectional configurations, it has been found that the use of a helical channel having a generally triangular cross section, such as exhibited by helical channel 106, is advantageous. The cross-section of helical channel 106, which approximates a 30-60-90° triangle with the side opposite the 60° angle sloping downward toward vessel wall 3, allows the solution flowing in helical channel 106 to maintain maximum contact with vessel wall 3, thereby promoting efficient heat transfer without causing the solution to boil violently. Moreover, the boiling solution together with any aerosols generated is effectively contained.

It has also been found that a particularly suitable is a helical channel is one in which its cross-sectional area increases along the length of helical channel increases, as the distance from supply channel 140 increases. The increasing cross-sectional area reduces the acceleration of the fluids (primarily the liquid phase) flowing in helical channel 106 due to increasing specific volume as the solution undergoes evaporation. In addition, it is desirable to provide helical thread 104 on the outer surface of insert 100 with a pitch that tapers toward supply channel 140 as shown in FIG. 2. This permits a larger number of turns to be provided about the outer surface of insert 100 thereby lengthening helical channel 106 without increasing the diameter of containment vessel 2.

The need for, and degree of the pitch, is a function of the insert material selected and of the waste to be processed. An insert material which has high heat conductivity requires less pitch taper, if any. Materials with low heat conductivity benefit from require a greater pitch taper.

Annular flange 120 acts as a phase separator and serves to distribute steam from helical channel 106 into interior 9 and concentrated fluid to be distributed evenly around the circumference of interior wall 12 to promotes efficient heat transfer and complete final evaporation, dehydration, denitration and calcination. These objectives can be achieved by providing a number of different configurations. For example, annular flange 120 can be dimensioned such that it nearly engages interior wall 12 of containment vessel 2. In such a configuration, concentrated solution flowing from helical channel 106 that collects in annular reservoir volume 124 can pass through the gap between annular flange 120 and interior wall 12 and flow smoothly down interior wall 12 into collection region 8. It has been found that by directing the flow of concentrated solution down wall 12, rather than dripping the solution directly in to collection region 8, the formation of aerosols is reduced.

The fluid in reservoir volume 124 also assists in the thermal isolation of the upper heating zone adjacent helical channel 106 and the lower heating zone adjacent collection region 8. Thermal isolation between the upper heating zone adjacent helical channel 106 and the lower heating zone adjacent collection region 8 reduces the possibility of channel blockage. The heat applied to the upper zone should not evaporate the feed stream to a solid state that could result in the formation of a deposit and ultimately a blockage in helical channel 106. This can be controlled by keeping the temperature relatively low in the upper zone. The bottom zone can be operated at a much higher temperature to complete the evaporation, thermal decomposition and calcination processes. Heat conducted up the outer wall 3 of containment vessel 2 will boil the liquid in the reservoir volume 124. When materials of relatively low thermal conductivity, such as stainless steel are used for containment vessel 2, heat conduction up the wall of the can is reduced and the importance of the liquid in reservoir volume 124 for thermal isolation is lessened.

Vent(s) 122 are positioned above the concentrated solution that collects in annular reservoir volume 124 to permit steam to escape into interior 9 with minimal entrainment of liquid and the generation of aerosols that would contaminate the gaseous stream. As seen in FIGS. I and 2, vents(s) 122 can be disposed at an angle relative to the radial direction of annular flange 120. The angle and size of vents(s) 122 are selected so as to induce a circular or swirling motion to the steam escaping into interior 9 of containment vessel 2. This assists in driving any entrained aerosols in the outward direction toward interior wall 12, thereby improving aerosol containment within containment vessel 2.

Figure 3:
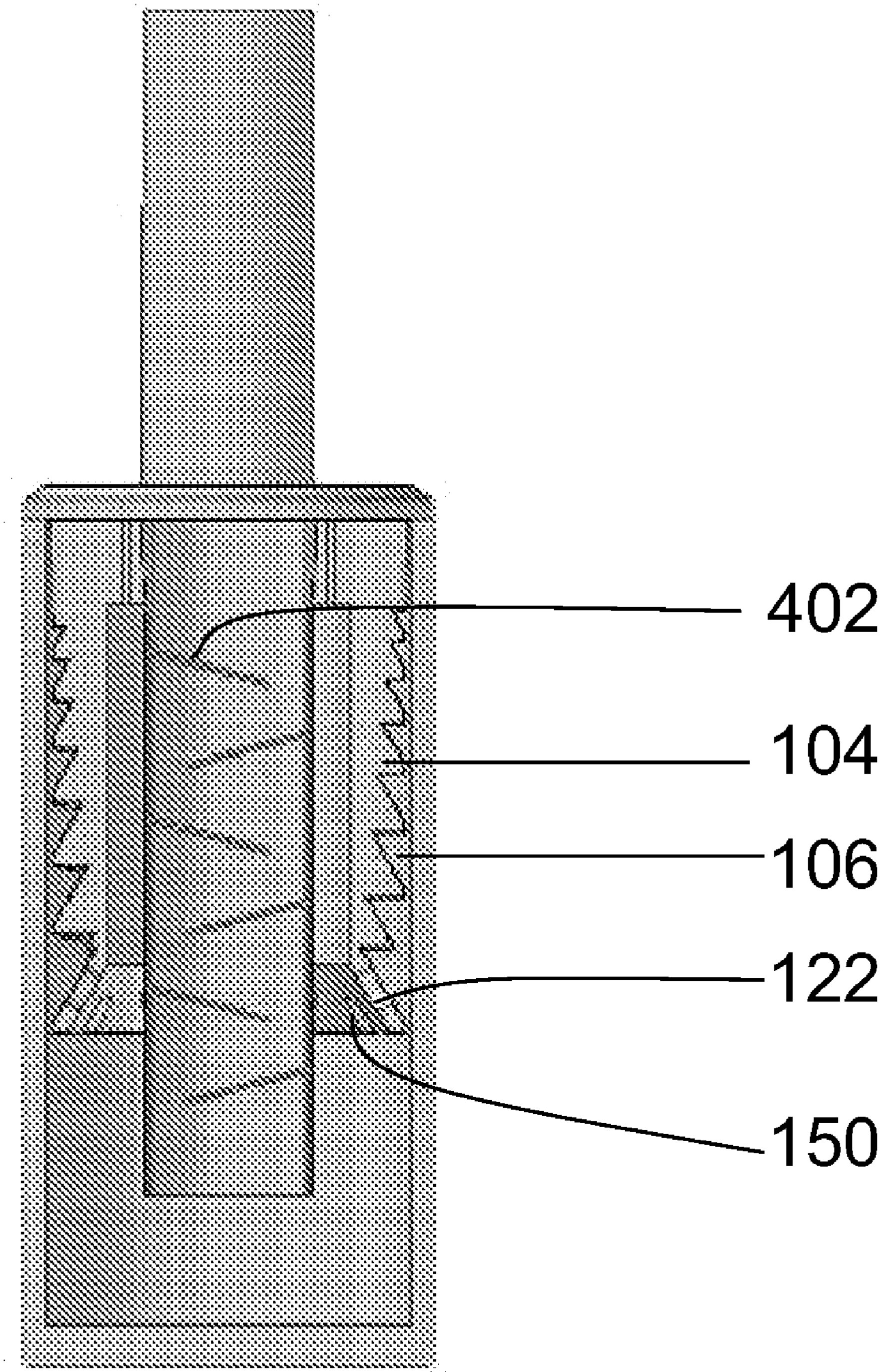
FIG. 3 is a cross-sectional view of an alternate embodiment of the evaporator/calciner of the present invention.

In the alternative, annular flange 120 can be dimensioned such that engages interior wall 12 of containment vessel 2. FIG. 3 depicts such an alternative embodiment in which slot(s) 150 are provided in annular flange 120 to permit concentrated solution in annular reservoir volume 124 to flow onto interior wall 12 in collection region 8, while vent(s) 122 permit steam in annular reservoir volume 124 to escape into interior 9 of containment vessel 2. Alternatively, a row of holes or openings in annular flange 120 may be used instead of slot(s) 150. In a further alternative, slot(s) 150 can be omitted and both steam and concentrated solution escape from annular reservoir volume 124 through vent(s) 122. Concentrated liquid escaping through vent(s) 122 will flow on the downward facing surface of annular flange 120 to interior wall 12, and then into collection region 8.

Although the embodiment shown in FIG. 1 includes annular flange 120, the person skilled in the art will recognize that the invention can be practiced with other configurations that are effective to act as a phase separator and serve to distribute steam and concentrated liquid flowing from helical channel 106 into interior 9 and collection region 8.

Dust scrubber screen(s) 402 are provided within containment vessel 2 and are positioned in the flowpath of steam and off-gases generated by evaporation and thermolytic reactions such as dehydration, denitration and calcination that occur in converting the liquid feed stream to solid form. Dust scrubber screen(s) 402 retain particulate matter entrained within the off-gases and provide improved containment, inventory control and ease of subsequent handling and disposal of the calciner/evaporator. For example, dust scrubber screen(s) 402 can be formed of a fine stainless steel metal mesh having openings of approximately 0.5 mm or a stack of perforated metal plates with non-coincident hole positions. Other suitable off-gas scrubbing apparatus for particulate removal is well known in the art and can be used in the present invention.

Containment vessel 2 is adapted to be easily sealed and disposed of or stored after use. Following evaporation/calcination, insert 100 and dust scrubber remain in containment vessel 2 The fittings associated with feed inlet(s) 110 and exhaust gas orifice(s) 112 are disconnected, calciner/evaporator 1 is removed from furnace 300 and sealed by welding a lid or securing any other suitable closure means to open end 4. In the alternative, fittings that provide a mechanical closure, such as are available from The Swagelok Company can be used to connect to feed inlet(s) 110 and exhaust gas orifice(s) 112 insert 100. These same fittings can be capped to provide a seal for long term storage.

Figure 5:
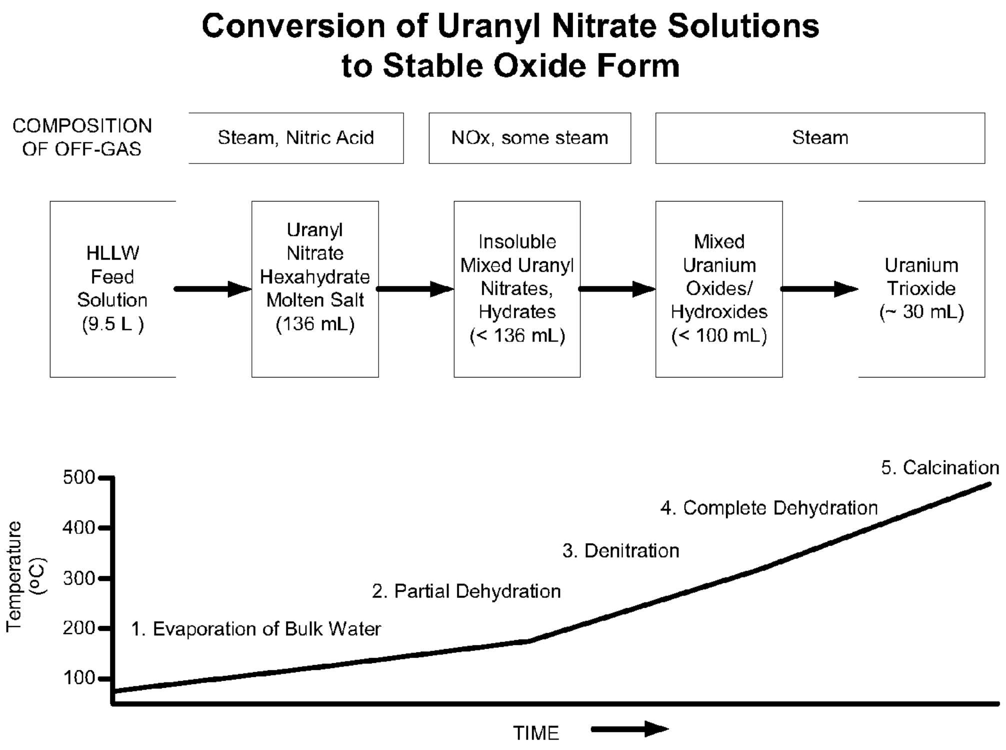
FIG. 5 depicts conversion of uranyl nitrate solutions to stable oxide form using the evaporator/calciner of the present invention.

The apparatus and method of the present invention are particularly suitable for conversion of acidic, aqueous solutions of uranyl nitrate to a stable oxide form, and therefore find application in reducing the volume of highly radioactive liquid wastes arising from isotope production processes. FIG. 5 illustrates the stages involved in the conversion of uranyl nitrate solution to stable oxide form. In this example, 9.5 L of High Level Liquid Waste (HLLW) feed solution containing uranyl nitrate produced as a waste product from isotope production is supplied to helical channel 106 where it initially undergoes evaporation of bulk water to produce steam and nitric acid in the off-gas stream, as well as concentrated solution containing uranyl nitrate hexahydrate salt. The transformation from solution to molten salt is typically about 85%-95% complete while the solution flows through helical channel 106. The concentrated solution flows over interior wall 12 in collection region 8 where it undergoes partial dehydration, denitration, complete dehydration and calcination to produce steam and mixtures of uranium nitrates, hydrates hydroxides and oxides. Throughout this process, insoluble mixed uranyl nitrates and hydrates, mixed uranium oxides and hydroxides, and finally about 30 mL of uranium trioxide are produced. At any point in time during the process, the material in collection region 8 will include the full range of compounds from molten salt to calcined uranium oxide. Predominately, only steam is generated in helical channel 106. The other processes occur in collection region 8. NOx gases formed during denitration react with the steam present in interior 9 to form nitric acid that is transferred to the concentrated solution. In this way, the volume and concentration of NOx released from the system is minimized.

The steam produced in the process flows to interior 9 of vessel 2, and up the interior of the insert 100 and out exhaust gas orifice(s) 112. Exhaust gas orifice(s) 112 leads through a suitable conduit to a condenser, a condensate collection vessel, additional off-gas treatment systems or devices as required. Dust scrubber screens collect aerosols and particulate that may be generated during boiling, dehydration, denitration and calcination processes. The inclusion of the dust scrubbers inside the collection vessel 2 provides improved containment and reducing subsequent cleaning and maintenance operations.

Containment vessel 2 and insert 100 are fabricated from materials compatible with the hazardous material to be evaporated and thermally decomposed, or calcined. Although aluminum has been shown to improve heat transfer to the feed solution as compared to stainless steel, is unsuitable for use in conversion of acidic, aqueous solutions of uranyl nitrate to a stable oxide form because or its inability to withstand hot nitric acid. For this application, stainless steel is preferred. Additionally, a variety of polymers may be suitable in environments without radiation, and their selection is within the ability of the skilled worker.

The flow rate of the feed solution, the arrangement and temperature setting of the external heating elements, and the operating pressure within the system can be varied and controlled to optimize the system performance in each application. The ranges of flow rates and temperatures will vary with the nature and composition of feed solution. For example, with uranyl nitrate solutions containing 18.5 g U/L and 0.3 mol/L nitric acid, the evaporator/calciner of the present invention has been shown to operate smoothly at a feed solution flow rate of 16 mL/min with upper heating block 302 set to ~250° C. and lower heating block 304 set to ~450° C. The depth and pitch taper of helical thread 104, the material selection, the ratio of insert length to collection volume may also be varied to optimise the process to various other fluids and solutes.

It will be clear that various solutions of hazardous liquid materials such as highly radioactive wastes, toxic metals, dangerous organic compounds, etc. can be treated by removing solvent and thermalizing or pyrolizing the residue using the calciner/evaporator of the present invention. Liquid wastes suitable for processing include slurries containing radioactive or other hazardous materials so long as processing conditions are established in which helical channel 106 is not blocked by formation of solid deposits. Additional uses include, but are not limited to, concentrating dilute solutions for subsequent analysis or recovery of solutes, whether associated with hazards and/or other materials.

The present invention provides rapid and contained removal of solvent from solutions of hazardous material. The invention is robust and simple to construct, operate and maintain. Hazardous materials, such a radioactive liquids, are converted into chemically stable, solid forms by evaporating, drying and calcination within a single vessel, that can then be sealed and used for long term storage. Combining several process stages including evaporation, drying and thermal decomposition operations in a single vessel minimizes material losses and risks associated with handling hazardous materials. The present invention is suitable for small scale operations, hot cell operations using remote-handling manipulators, and rigorous containment of hazardous, fissile and highly radioactive materials and facilitates subsequent handling, storage, inspection and verification and disposal.

The invention being thus described, it will be obvious that the same may be varied in many ways without departing from the spirit and scope of the invention, and all such modifications as would be obvious to one skilled in the art are intended to be included within the scope of the following claims.

The embodiments of the invention in which an exclusive property or privilege is claimed are defined as follows:

1. A device for converting liquid material into solid form by evaporation, drying and calcining comprising a containment vessel adapted to be placed in heat exchange transfer relation with an external source of heat;

said containment vessel comprising a fluid inlet; an elongated passageway; a collection chamber; a scrubber; and an exhaust outlet;

said fluid inlet adapted for connection to a source of liquid material to be converted;

said elongated passageway in fluid communication at one end with said inlet and at the other end with said collection chamber, and in heat transfer relation with said external source of heat whereby said liquid material flowing in said passageway is converted into a gaseous phase and a concentrated liquid phase;

means for directing said gaseous phase from said passageway into said collection chamber and for directing said concentrated liquid phase from said passageway onto the walls of said collection chamber;

said walls of said collection chamber being in heat transfer relation with an external source of heat, whereby said concentrated liquid phase is converted into a gaseous phase and calcined solid material in said collection chamber;

said exhaust outlet being in fluid communication with said collection chamber for conducting said gaseous phase out of said containment vessel;

said scrubber being disposed in said containment vessel between said collection chamber and said exhaust outlet for removal of aerosols and particulate matter entrained in said gaseous phase.

2. The device of claim 1 further comprising means for sealing said containment vessel to retain said calcined solid material and said particulate matter in said containment vessel for storage or disposal.

3. The device of claim 2 wherein the containment vessel is cylindrical and the elongated passageway is of generally helical configuration disposed about the inner wall of said containment vessel.

4. The device of claim 3 where the fluid inlet, elongated passageway, scrubber; and exhaust outlet are disposed on a cylindrical insert adapted for insertion into said containment vessel.

5. The device of claim 4 comprising an external thread disposed on the outer surface of said insert and sealingly engaging the inner wall of said containment vessel, said elongated passageway being defined by the groove of said thread and said inner wall.

6. The device of claim 5 wherein the elongated passageway has a generally right-triangular cross-sectional shape, with the hypotenuse being disposed in a downward and outward direction.

7. The device of claim 6 wherein the cross-sectional area of the elongated passageway increases toward said collection chamber.

8. The device of claim 7 wherein the pitch of the helical elongated passageway increases with increasing cross-sectional area.

9. The device of claim 1 wherein the temperature of the external source of heat in heat transfer relation with said elongated passageway is controlled independently of the temperature of the external source of heat in heat transfer relation with said collection chamber.

10. The device of claim 9 wherein the external source of heat in heat transfer relation with said collection chamber is maintained at a higher temperature than the external source of heat in heat transfer relation with said elongated passageway.

11. The device of claim 5 wherein said means for directing comprises an annular reservoir in fluid communication with said elongated passageway for receiving and separating said gaseous and concentrated liquid phases, said reservoir having one or more openings for directing said gaseous phase into said collection chamber and said concentrated liquid phase onto the walls of said collection chamber.

12. The device of claim 11 in which said reservoir is defined by a downwardly and outwardly directed annular flange disposed at the bottom of said insert which engages at its lower periphery the inner wall of said containment vessel and having one or more openings disposed above said concentrated liquid phase for directing said gaseous phase into said collection chamber, and one or more openings below said gaseous phase for directing said concentrated liquid phase onto the walls of said collection chamber.

13. The device of claim 11 in which said reservoir is defined by a downwardly and outwardly directed annular flange disposed at the bottom of said insert which is in close spaced relation at its lower periphery with the inner wall of said containment vessel and defining an annular gap therebetween for directing said concentrated liquid phase onto the walls of said collection chamber.

14. The device of claim 2 wherein said sealing means comprises a plate adapted to be affixed to said containment vessel to define a sealed inner volume in which said fluid inlet and exhaust outlet are disposed.

15. The device of claim 2 wherein said sealing means comprise a closable mechanical coupling connected to each of said fluid inlet and exhaust outlets.

16. A method for converting liquid material into solid form by evaporation, drying and calcining within a single containment vessel comprising:

providing a containment vessel having an elongated passageway in fluid communication with a collection chamber;

supplying a stream of said liquid material to said elongated passageway;

heating said elongated passageway to cause said liquid material to convert in said passageway to a gaseous phase and a concentrated liquid phase;

separating said gaseous and concentrated liquid phases;

applying said separated concentrated liquid phase to the walls of a collection chamber;

heating the walls of said collection chamber to cause said concentrated liquid material to convert to a gaseous phase and a calcined solid phase;

passing said gaseous phases through a scrubber to remove entrained aerosols and particulate materials;

venting said scrubbed gaseous phases out of said containment vessel.

17. The method of claim 16 further comprising sealing said calcined solid phase inside said containment vessel for disposal or storage.

18. The method of claim 16 wherein the elongated passageway is of generally helical configuration disposed about the inner wall of said containment vessel.

19. The method of claim 16 including heating the walls of said collection chamber to a higher temperature than the elongated passageway.

20. The method of claim 16 wherein the step of separating the gaseous and concentrated liquid phases is carried out in an reservoir in fluid communication with said elongated passageway and having one or more openings for directing said gaseous phase into said collection chamber and said concentrated liquid phase onto the walls of said collection chamber.

21. The method of claim 17 wherein said step of sealing comprises affixing a plate to said containment vessel to define a sealed inner volume in which said fluid inlet and exhaust outlet are disposed.

22. The method of claim 17 wherein said step of sealing comprises closing a mechanical coupling connected to each of said fluid inlet and exhaust outlets.

23. The method of claim 16 wherein the liquid material is uranyl nitrate and the solid form is uranium trioxide.

24. The method of claim 23 wherein the elongated passageway is heated to a temperature of about 250° C. and the walls of said collection chamber are heated to a temperature of about 450° C.

* * * * *